Feb. 2, 1954

B. C. THOMSON 2,667,732

LOADING AND CLEANING ATTACHMENT FOR CANE HARVESTERS

Filed May 3, 1950

INVENTOR

BYRON C. THOMSON

BY Wilkinson+Mawhinney
ATTORNEYS

Feb. 2, 1954  B. C. THOMSON  2,667,732
LOADING AND CLEANING ATTACHMENT FOR CANE HARVESTERS
Filed May 3, 1950  5 Sheets-Sheet 3

INVENTOR
BYRON C. THOMSON
BY Wilkinson & Mawhinney
ATTORNEYS

Feb. 2, 1954        B. C. THOMSON        2,667,732
LOADING AND CLEANING ATTACHMENT FOR CANE HARVESTERS
Filed May 3, 1950        5 Sheets-Sheet 4
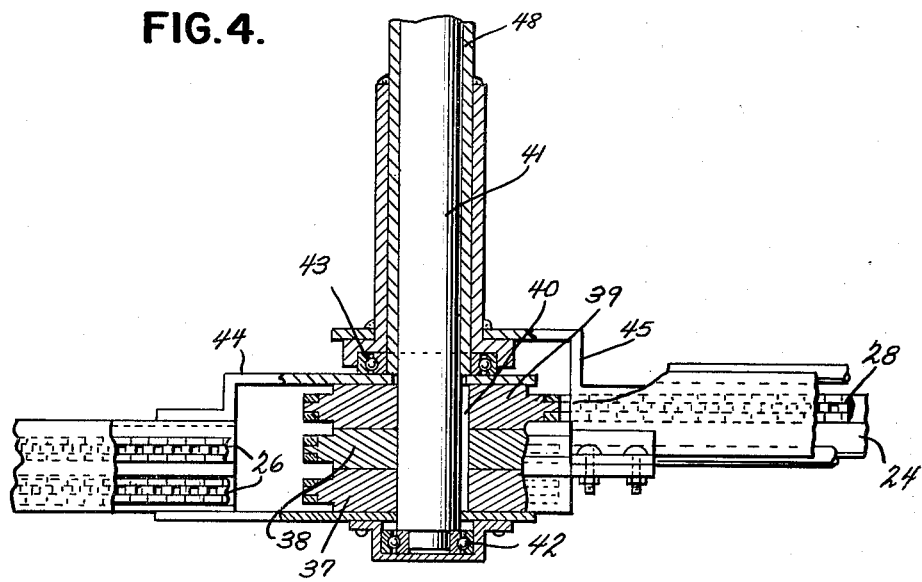
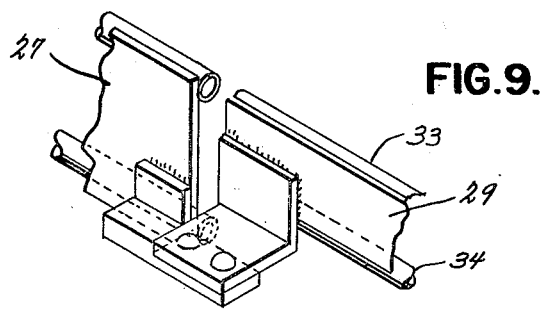
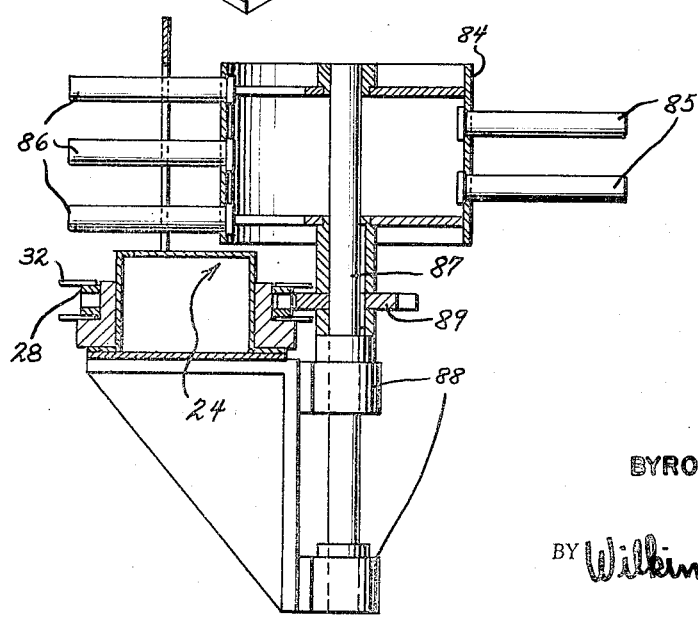
INVENTOR
BYRON C. THOMSON
BY Wilkinson & Mawhinney
ATTORNEYS

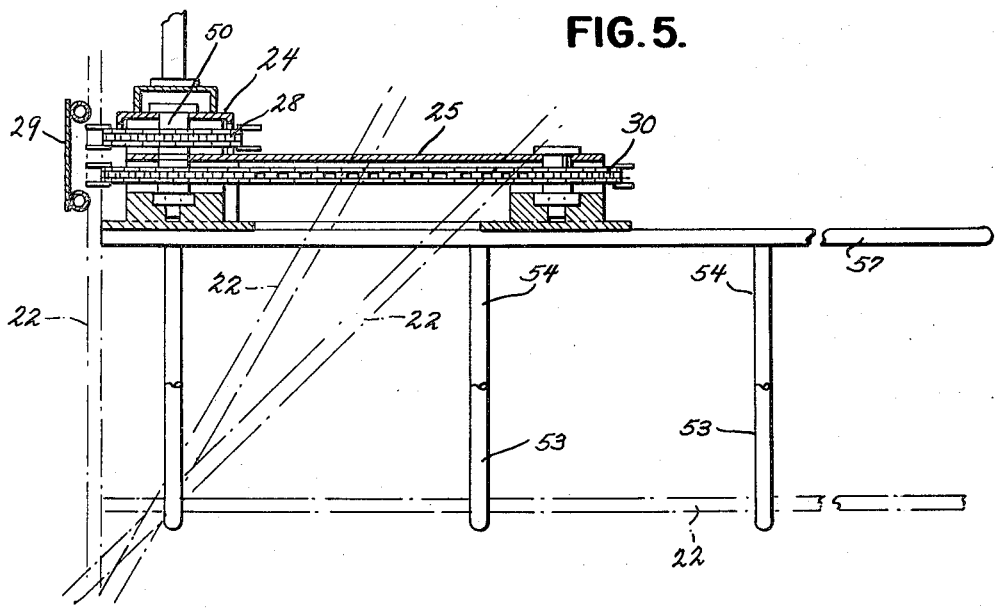
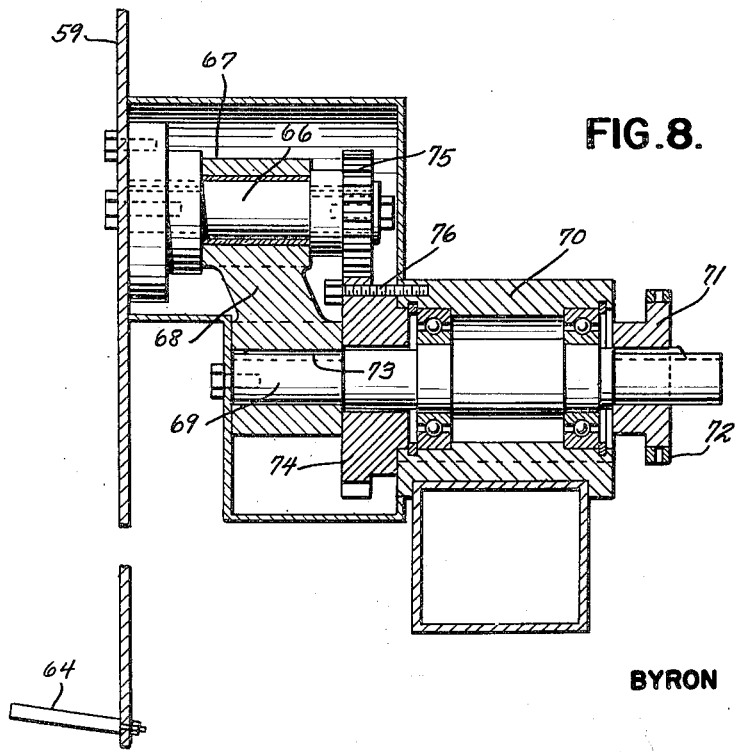

Patented Feb. 2, 1954

2,667,732

UNITED STATES PATENT OFFICE 2,667,732

LOADING AND CLEANING ATTACHMENT FOR CANE HARVESTERS

Byron C. Thomson, Thibodaux, La., assignor to B. C. Thomson Co., Inc.

Application May 3, 1950, Serial No. 159,807

7 Claims. (Cl. 56—473.5)

The present invention relates to improvements in loading and cleaning attachment for cane harvesters, and consists in certain improvements over and an extension of the principle of my prior patent entitled Cane Piler, 2,427,313, granted September 9, 1947.

An object of the present invention is an attachment to a cane harvester by which the harvested cane may be directly loaded into wagons which may be then conveyed directly to the mills or to a railroad for ultimate transportation to the mills.

Another object of the invention is to provide a cane harvester and loading attachment in which the canes are gathered, topped, severed at their lower ends from the ground, cleaned and delivered to wagons in one continuous operation whereby the clean, freshly cut cane may be delivered to the mill without the necessity of piling the same in the field and ultimately gathering the cane into wagons, whereby the cane is not exposed to the weather and is not delayed in its delivery to the mills.

A further object of the invention is to provide an improved defoliating or deleafing device for stripping the cane of leaves and other matter whereby to present the cane in the best possible condition for milling.

A still further object of the invention is to provide an improved trash removing device for the cane which will serve the same purpose of producing clean cane for the mills and which when used in conjunction with the defoliating device will remove from the cane trash that has been loosened and left by the defoliating device.

With the foregoing and other objects in view, the invention will be more fully described hereinafter and more particularly pointed out in the appended claims.

In the drawings, in which like parts are denoted by the same reference characters throughout the several views, Figure 1 is a rear elevational view of a cane harvester illustrating a form of the improved loader applied thereto.

Figure 4 is a vertical section taken on an enlarged scale on the line 4—4 in Figure 3.

Figure 5 is a section taken on the line 5—5 in Figure 1 showing diagrammatically in broken lines the movement of the cane stalks being carried around and deposited in the basket or cradle.

Figure 6 is a cross section taken on an enlarged scale on the line 6—6 in Figure 1.

Figure 7 is a similar section taken on an enlarged scale on the line 7—7 of Figure 1 and showing the cleaning fingers on the drum.

Figure 8 is a horizontal section taken on an enlarged scale on the line 8—8 of Figure 1, and Figure 9 is a fragmentary perspective view of the pressure bars of adjacent conveyor sections.

Figure 1:
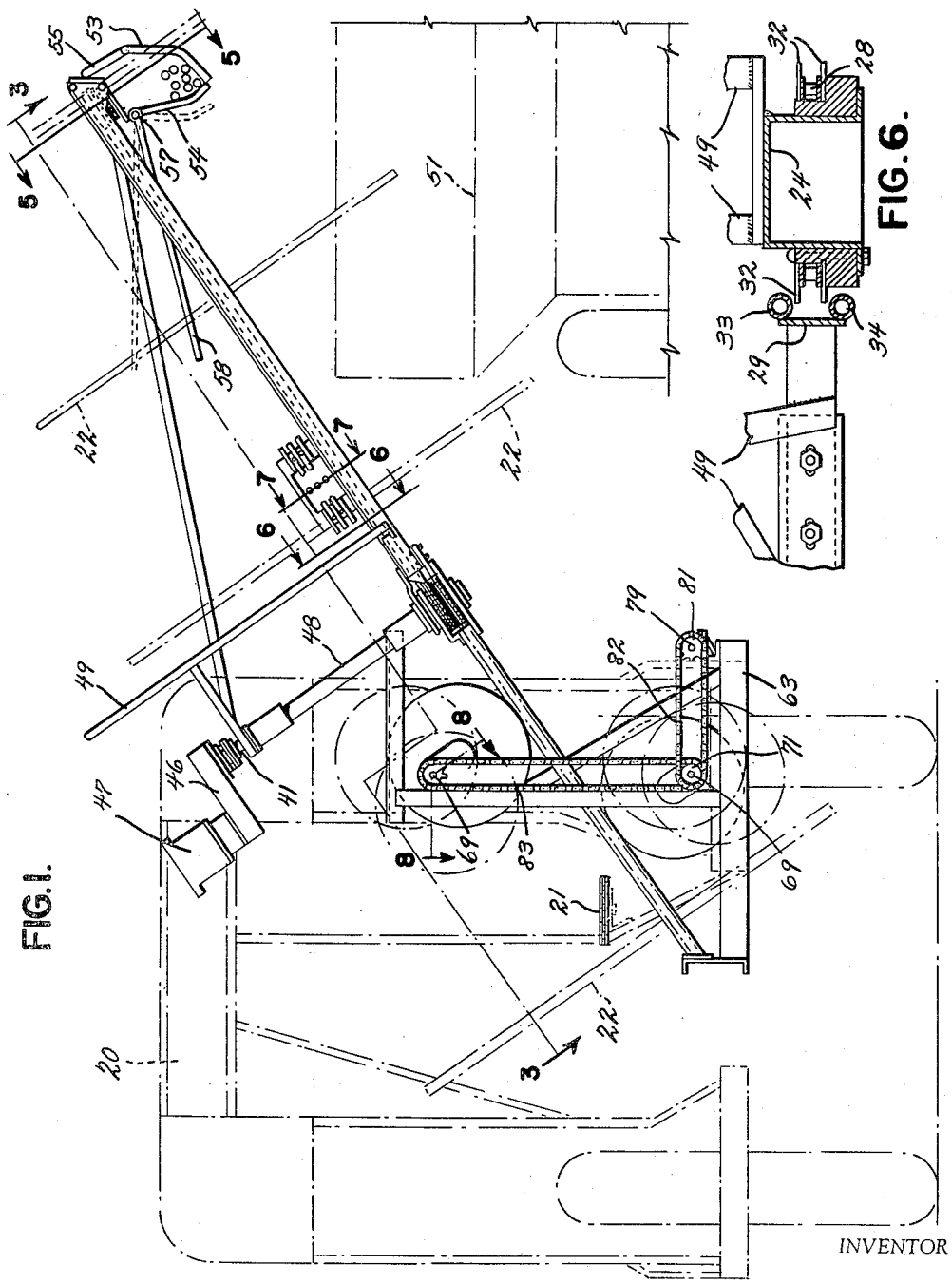

Referring more particularly to the drawings, 20 designates a cane harvester of the type shown in my prior Patent 2,427,313, granted September 9, 1947, and provided with cane gathering equipment, a topper, for severing the tops of the cane stalks, a cutter for severing the cane close to the ground and a longitudinal conveyor 21 whereby the canes are moved to the rear of the harvester as the harvester progresses along the cane rows through the field. The canes or cane stalks are indicated at 22.

The improved loading attachment consists generally of a conveyor adapted to be mounted upon the harvester 20 preferably transversely thereof and also preferably at the rear end thereof where the receiving end of the conveyor will be positioned to receive the canes 22 from the rear discharge end of the longitudinal harvester conveyor 21.

The conveyor may consist of a fixed inner section, the frame, beam or boom of which is indicated at 23, an intermediate section 24 and a discharge section 25. Besides the frame members of the conveyor sections, such sections preferably comprise pairs of endless sticker chains and pressure bars 26, 27, 28, 29 and 30, 31. The chains carry the triangular or other shaped impaling pins or blades 32, which, as shown in Figure 6, are adapted to enter for a distance at their free pointed ends into the intermediate space between the upper and lower tubular or bulged portions 33 and 34 of the pressure bars, which latter hold the cane stalks in a substantially upright position against the impaling knife edges 32 which therefore bite into the cane stalks and cause the canes to be positively moved along the pressure bars 27, 29 and 31 to the outer discharge end of the conveyor.

The innermost end of the inner pressure bar 27 extends inwardly of the inner conveyor section 23 and is bent diagonally forward to constitute a deflecting bar 35 arranged in a position to intercept the canes 22 as they come off the longitudinal harvester conveyor 21 and divert the canes into the space between the pressure bar and the inner conveyor chain 26.

The inner section of the conveyor is adapted to be affixed to the rear end of the harvester 20 by appropriate supports and braces and such inner section may involve one or more chains for instance two such chains 26 are shown in Figure 4 as being arranged one over the other. These chains 26 run over inner sprockets 36 mounted in the conveyor frame section 23 and over the sprockets 37 and 38 shown more particularly in Figure 4. The intermediate section 24 of the conveyor is shown in Figure 4 to comprise a single sticker chain 28 which at its inner end is trained about a sprocket 39. In Figure 4 the sprockets 37, 38 and 39 are shown as co-axial, all being driven by a key 40 from a drive shaft 41 mounted in appropriate bearings 42 and 43 on knuckle sections 44 and 45 of casings which receive the adjacent ends of the inner and intermediate conveyor sections 23 and 24 and which permit the intermediate section 28 to pivot about the axis of the drive shaft 41 to enable the outer portions of the conveyor to be folded close against the side of the harvester 20 as when the harvester is moving toward and from the cane field.

Figure 2:
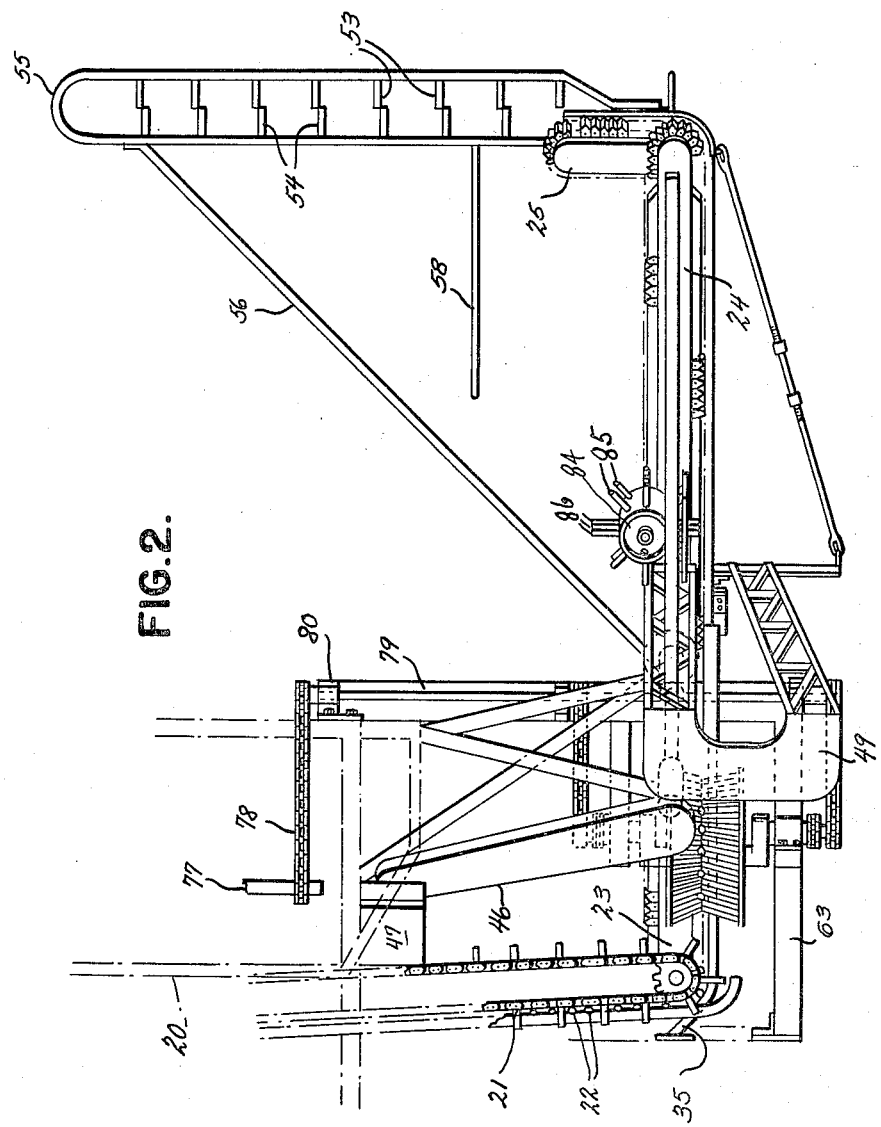
Figure 2 is a top plan view of a portion of a cane harvester showing the improved loader in a position of use thereon.

As shown in Figures 1 and 2, the shaft 41 is driven through appropriate gearing mounted in a chain case 46 from the power take-off 47 of the harvester. A sleeve 48 may serve as a bearing and guide for the drive shaft 41 and the same is mounted to the harvester 20 by suitable supports.

The pressure bars 27, 29 and 31 may be carried in any suitable manner from the respective frame members 23, 24 and 25 of the three conveyor sections as by the use of arches 49, which are also shown and described in my prior Patent 2,427,313, aforesaid. These arches 49 are sufficiently tall to permit the canes 22 to move therethrough without interference.

Figure 3:
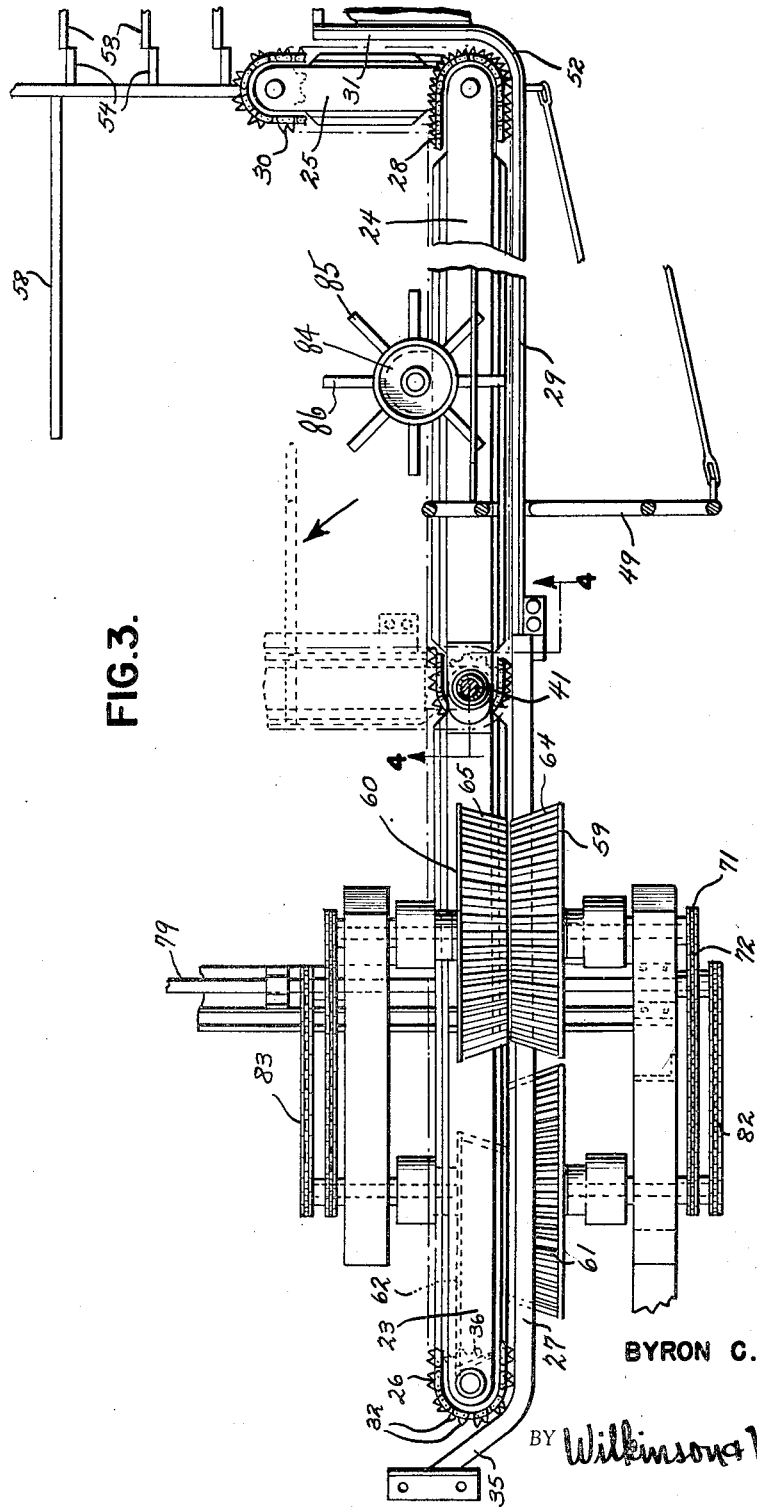
Figure 3 is an enlarged fragmentary sectional view taken on the line 3—3 in Figure 1.

Referring more particularly to Figures 3 and 5 the intermediate and discharge chains 28 and 30 overlap so as to form continuity between the same and the sprockets of these chains are coaxial and mounted upon a pivotal axis 50 whereby the discharge section 25 may be adjusted angularly with respect to the intermediate conveyor sections 24 for causing the canes to be delivered at a proper position to the basket and with respect to the wagon 51 indicated in Figure 1.

The pivot 50 may be splined to the overlapping sprockets of the chains 28 and 30 in order to drive the discharge chain 30 from the intermediate chain 28.

A curved deflector section 52 of the pressure bars 29, 31 guides the canes around from the intermediate to the discharge conveyor. Extending off the discharge end of the conveyor is a cane receiving basket or cradle composed of the tines 53 and 54 mounted upon a suitable framework 55 carried by the conveyor and if desired by one or more braces 56. As shown in Figure 2 the tines 53 and 54 may be mounted in spaced pairs and the basket is located in the direction of the rows of canes and as to its lengthwise dimension it extends substantially parallel to the path of movement of the harvester 20, at least when suspended alongside the harvester. As shown in Figure 1, the tines 53, 54 converge downwardly to close the lower portion of the basket and the basket is sufficiently deep to receive an accumulation of the canes. The tines 54 at one side may be pivoted as indicated at 57 to swing out to the dotted line position, shown in Figure 1, upon the raising of the handle 58 for the purpose of dumping the basket and releasing the cane into the wagon 51. A defoliating or deleafing device is also preferably mounted on the harvester shown more particularly in Figures 1, 3 and 8.

This device consists of one or more pairs of discs. In the instance shown a pair of discs 59, 60, is shown above the fixed conveyor section 23 and a second pair of discs 61 and 62 is located below the fixed conveyor section 23, the same being mounted in appropriate parts 63 of a framework attached to the harvester 20.

Each pair of discs contains resilient fingers 64 and 65 angularly projecting from the discs slantwise and/or straight toward one another and substantially meeting on the line between the chain 26 and the pressure bar 27 so that the free ends of the fingers contact the cane as it is moved therethrough by action of the conveyor.

The discs have preferably both a rotary and a gyratory or planetary motion by reason of the mounting shown in Figure 8 in which a stub shaft 66 to which the disc 59 is made fast is rotatably mounted in a bearing 67 in the outer portion of a crank arm 68 affixed to a central spindle 69, which spindle is rotatably mounted in a bearing 70. The spindle 69 is driven by a sprocket 71 fixed thereon which sprocket is engaged by a chain 72. The crank arm is fixed as by a spline 73 to the spindle 69 and rotates therewith. Intermeshing pinions 74 and 75 are arranged to rotate the stub shaft 66 about its own axis during its revolution around the axis of the central spindle 69. To this end the pinion 75 is affixed to the stub shaft 66 while the pinion 74 is held by a set screw 76 to the stationary bearing or frame member 70. The pinion 74 is journaled on the central spindle 69 but the spindle 69 rotates freely within the pinion 74.

As shown in Figure 2 a harvester driven shaft 77 is connected by sprocket and chain or other gearing 78 to a drive shaft 79 mounted in appropriate bearings 80 on the framework of the harvester or on the supplemental attachment frame 63.

Sprockets 81 on the drive shaft 79 through chains 82 and 83 drive the central spindles 69 through the sprockets 71. The spindles 69 of the upper and lower disc pairs 59, 60 and 61, 62 may be connected together by chains 83 for concurrent drive.

A device to remove loose trash from the cane in the vicinity of the carrier sticker chain 28 may also be provided as shown in Figures 1, 2, 3 and 7. This device comprises a drum 84 from which project resilient or other fingers, preferably in two groups which alternate around the periphery of the drum and extend radially out therefrom. One group consists of the pair of vertically spaced fingers 85 and the other group consists of a group of three vertically spaced fingers 86 in relatively offset relation to the fingers 85 so that as the drum 84 rotates the fingers 85 will follow in the path of the spaces between the fingers 86 in order to give complete coverage of the cane stalks.

As shown in Figure 3, the drum 84 is so arranged with reference to the central section 24 of the conveyor that the free ends of the fingers 85, 86 will engage the cane passing along between the chain 28 and the pressure bar 29.

The drum 84 may be rotated in any suitable manner; for instance its supporting shaft 87 may be mounted at appropriate bearings 88 and have affixed thereto a sprocket 89 the teeth of which mesh with the spaces between the links of the chain 28. This drum may be revolved at a suitable speed.

In the use of the device, the harvester and attachment will cut the cane, top and bottom, clean the leaves and trash therefrom, and in addition, load the cleaned cane directly into wagons for delivery to the mill or railroad. In this way clean, freshly cut cane will be supplied to the mills, and by so doing it is estimated that the same will increase the sugar yield per ton of cane from ten to twenty pounds of sugar. At the present sugar prices and the total Louisiana production of about six million tons of cane, such an increase will add from three million to seven million dollars in value to the sugar cane crop annually.

The cane will be loaded directly from the harvester into an adjoining wagon as it is cut. It will be appreciated from Figure 1 that the conveyor, which is on an inclination, will receive the cut cane directly from the longitudinal conveyor 21 of the harvester in a substantially upright or standing position in which the cane projects through the conveyor and is impaled by the sticker chain.

The chains of the conveyor sections move the canes 22 outwardly as shown by the broken lines in Figure 1. As shown in Figure 5, the canes 22 are compelled to make a substantially right angle turn at the upper outboard end of the conveyor and as the canes are moved along by the discharge conveyor belt 30 they encounter at their lower portions the first pair of tines 53, 54 of the basket, thus arresting the lower portions of the canes 22 while the upper portions are carried along by the carrier sticker chain 30. In this way the cane is tripped and caused to fall down to a substantially horizontal position with its length in alignment with the cane rows and with the length of the wagon body, the canes being received upon the lower closed ends of the tines by which they are supported until an accumulation of the cane occurs. Cane drops more uniformly when in a bundle than when in single stalks. The present loader takes the cane as it comes from the harvester in an upright position and only trips it to a prone position when it is dropped into the basket at the elevated end of the cane loader. From time to time the operator will lift upwardly upon the handle 58 thus dumping the basket and permitting the canes to drop into the wagon 51 which is being driven alongside the harvester. In this way the operation is a continuous one, an empty wagon replacing a full one and the operation proceeding without interruption.

As the cane is conveyed to the wagons it is subjected to the rotary and planetary motion of the discs. By virtue of the composite motion given these discs the resilient fingers 64 receive a scrubbing motion not only circularly across the cane stalks but also up and down such stalks.

One or more drums 84 having flexible fingers may also be provided to remove trash which has been loosened by the planetary motions of the discs but is still held between the canes.

It is obvious that various changes and modifications may be made in the details of construction and design of the above specifically described embodiment of this invention without departing from the spirit thereof, such changes and modifications being restricted only by the scope of the following claims.

What is claimed is:

1. A cane harvester comprising means for conveying severed cane stalks in upstanding position longitudinally of cane rows, means receiving the stalks from said conveying means and for conveying the stalks in substantially upstanding position upwardly and outwardly of the harvester to a point outboard of the harvester, means for receiving the stalks from said second conveying means and for conveying the stalks in upstanding position longitudinally of the cane rows and outboard of the harvester, a stalk receiving basket positioned longitudinally of the cane rows to receive the stalks from said third conveying means and having means to trip the stalks to cause them to lie prone in the basket longitudinally of the cane rows, said basket being positioned outboard of the harvester and at a height above the ground to permit a wagon to travel thereunder parallel to the cane rows, and means for opening the basket to permit the stalks to fall into the wagon.

2. A cane harvester comprising means for conveying severed cane stalks in upstanding position longitudinally of cane rows, means for changing the direction of travel of the stalks from longitudinally of the cane rows to transversely of the cane rows, means for conveying the stalks from said direction changing means transversely of the cane rows and outboard of the harvester with the stalks in an upstanding position, means for changing the direction of travel of the stalks from transversely of the cane rows to longitudinally of the cane rows, means for conveying the stalks from the second direction changing means longitudinally of the cane rows with the stalks in an upstanding position, a stalk receiving basket positioned longitudinally of the cane rows to receive the stalks from the third conveying means and having means to trip the stalks so that the stalks lie prone in the basket longitudinally of the cane rows, and means for opening said basket to permit the stalks to fall into a wagon travelling longitudinally of the cane rows beneath the basket.

3. A loading attachment for cane harvesters comprising conveyor means adapted to receive from a harvester severed canes in upstanding position for conveying the canes in substantially upstanding position upwardly and outwardly of the harvester to a point outboard of the harvester and for turning and conveying the canes from said point in upstanding position longitudinally of the cane rows and outboard of the harvester, a cane receiving basket positioned at the discharge end of the conveyor means longitudinally of the harvester and of the cane rows to receive the canes from said conveying means and having means to trip the canes from their upstanding position to horizontal position lying prone in the basket longitudinally of the cane rows, said basket being at a height above the ground to permit a wagon to travel thereunder longitudinally of the harvester and cane rows, and means for opening the basket to permit the canes to fall into the wagon.

4. A loading attachment for cane harvesters comprising conveyor means adapted to be mounted on a harvester for receiving from the harvester severed canes in upstanding position and for conveying the canes in substantially upstanding position upwardly and outwardly of the harvester to a point outboard of the harvester and for turning and conveying the canes from said point in upstanding position longitudinally of the cane rows and outboard of the harvester, a cane receiving basket adapted to be mounted on the harvester and positioned longitudinally of the cane rows to receive the canes from said conveying means and having means to trip the canes to cause them to lie prone in the basket longitudinally of the cane rows, said basket adapted to be positioned outboard of the harvester and at a height above the ground to permit a wagon to travel thereunder longitudinally of the cane rows, and means for opening the basket to permit the canes to fall into the wagon, said conveyor means comprising sticker means for impaling the canes and a plurality of endless conveyor sections hinged together and overlapping at their hinged joints and drive means for said sections adapted to be operated from the harvester.

5. A loading attachment for cane harvesters comprising conveyor means adapted to be mounted on a harvester for receiving from the harvester severed canes in upstanding position and for conveying canes in substantially upstanding position to an elevated point laterally outboard of the harvester, conveying means for conveying the canes from said point in upstanding position longitudinally of the cane rows and outboard of the harvester, a cane receiving basket adapted to be mounted on the harvester and positioned longitudinally of the cane rows to receive the canes and arrest the movement of the lower portions of the canes while said second conveyor means continues to move the upper portions of the canes, whereby the canes are tripped and caused to lie prone in the basket longitudinally of the cane rows, said basket adapted to be positioned outboard of the harvester and at a height above the ground to permit a wagon to travel thereunder parallel to the cane rows, means for opening the basket to permit the canes to fall into the wagon.

6. A loading attachment for cane harvesters comprising means adapted to be mounted on a harvester for receiving from the harvester severed canes in upstanding position and for conveying the canes transversely of the cane rows and upwardly and laterally outboard of the harvester and maintaining the canes in an upstanding position, conveyor means for receiving the canes from said first conveyor means and for conveying the canes longitudinally of the cane rows and maintaining the canes in upstanding position and having a discharge end portion, an elongated cane receiving basket adapted to be supported by the harvester and positioned longitudinally of the cane rows to receive the canes from the second conveyor means and having a portion underlying the discharge end portion of said second conveyor means provided with means for arresting the movement of the lower end portions of the canes to trip the canes into a recumbent position into the basket longitudinally of the cane rows, and means for opening said basket to permit the canes to fall therefrom.

7. For use with cane conveying mechanism in a cane harvester, conveyor means receiving the severed canes from such mechanism in their original upstanding severed position for conveying the canes angularly upwardly and outwardly of the harvester to a point outboard of the harvester, conveyor means positioned at the discharge end of said first conveyor means for returning said canes to their original upstanding position and conveying them in said upstanding position longitudinally of the cane rows and outboard of the harvester, a cane receiving container positioned at the discharge end of the second conveyor means longitudinally of the cane rows to receive the canes from the second conveyor means and cooperating with the second conveyor means to trip the canes from their upstanding position to horizontal position lying prone in the container longitudinally of the cane rows, said container being at a height above the ground to permit a wagon to travel thereunder longitudinally of the cane rows, and means for opening the container to permit the canes to fall into the wagon.

BYRON C. THOMSON.

References Cited in the file of this patent

UNITED STATES PATENTS

| Number | Name | Date |
|---|---|---|
| 109,523 | Lewin | Nov. 22, 1870 |
| 530,296 | Aiken | Dec. 4, 1894 |
| 834,046 | Cave | Oct. 23, 1906 |
| 858,061 | Cooper | June 25, 1907 |
| 958,790 | Wynberg | May 24, 1910 |
| 1,118,636 | Cockrell | Nov. 24, 1914 |
| 1,289,169 | Henderson | Dec. 31, 1918 |
| 1,510,479 | Hoven | Oct. 7, 1924 |
| 1,512,382 | Walsh | Oct. 21, 1924 |
| 2,235,596 | Weiss | Mar. 18, 1941 |
| 2,466,386 | Curioni | Apr. 5, 1949 |
| 2,546,165 | Patten | Mar. 27, 1951 |
| 2,556,509 | Thomson | June 12, 1951 |
| 2,577,328 | Hyman | Dec. 4, 1951 |